United States Patent [19]
Karlis et al.
[11] Patent Number: 4,712,713
[45] Date of Patent: Dec. 15, 1987

[54] GAS CYLINDER COUPLING AND WEIGHTING MECHANISM FOR A CARBONATED DRINK DISPENSER

[75] Inventors: Robert G. Karlis, Fairfield, Conn.; Charles M. Dole, Purdys, N.Y.; Gary L. Webster, Fairfield, Conn.; George J. Andersen, Garrison, N.Y.

[73] Assignee: Cadbury Schweppes, PLC, London, England

[21] Appl. No.: 799,919

[22] Filed: Nov. 20, 1985

[51] Int. Cl.⁴ .......................... B67B 7/24; G01G 3/00

[52] U.S. Cl. .......................... 222/3; 222/23; 222/41; 222/467; 177/225; 220/94 R; 220/85 E

[58] Field of Search .......................... 222/23, 3, 31, 4, 41, 222/465 R, 47, 49, 50, 466, 467, 400.7, 323, 402.25, 324, 5; 73/149; 141/351, 363; 177/45, 46, 47, 132, 225, 230; 220/94 A, 94 R, 85 E, 3, 85 P; 215/100 A; 169/74, 75, 89

[56] References Cited

U.S. PATENT DOCUMENTS

| | | | |
|---|---|---|---|
| 995,978 | 6/1911 | McCaslin | 222/5 X |
| 1,676,635 | 7/1928 | Costello | 222/466 X |
| 2,051,933 | 8/1936 | Andvig | 141/57 |
| 2,310,021 | 2/1943 | Heidbrink | 128/204.18 |
| 2,524,052 | 10/1950 | Grant | 137/596 |
| 2,536,428 | 1/1951 | Dimitri et al. | 222/3 |
| 2,776,849 | 1/1957 | Homuth | 251/149.6 |
| 2,809,658 | 10/1957 | Frantz et al. | 137/498 |
| 3,243,083 | 3/1966 | Reynolds et al. | 222/3 |
| 3,356,601 | 12/1967 | Crawford et al. | 204/156 |
| 3,967,578 | 7/1976 | Gallo | 177/225 X |
| 3,998,274 | 12/1976 | Liautaud | 169/89 |
| 4,298,551 | 11/1981 | Adolfsson et al. | 261/121.1 |
| 4,363,336 | 12/1982 | Cerrato | 222/400.7 X |
| 4,363,424 | 12/1982 | Holben et al. | 222/4 |
| 4,413,515 | 11/1983 | Quinn | 177/225 X |
| 4,454,831 | 6/1984 | Gallo | 177/45 X |
| 4,481,986 | 11/1984 | Meyers | 141/4 |
| 4,619,328 | 10/1986 | Seyler et al. | 169/74 X |

FOREIGN PATENT DOCUMENTS

| | | |
|---|---|---|
| 0453148 | 11/1949 | Italy . |
| 2050159 | 1/1981 | United Kingdom . |

*Primary Examiner*—Robert J. Spar
*Assistant Examiner*—Jay I. Alexander
*Attorney, Agent, or Firm*—Kenyon & Kenyon

[57] ABSTRACT

A gas cylinder coupling and weighing mechanism useful in a carbonated drink dispenser having a gas cylinder. The coupling and weighing mechanism supports the cylinder rotatably within a hood, the hood forming a lever which is biased upwardly by a spring. A full cylinder will pull the hood all the way down. As the cylinder is emptied, the hood will begin to move upward and when the cylinder is empty the hood will be fully upward. Mounted inside the hood is a fitting engaging with a mating fitting on the gas cylinder. The mating fitting is equipped with a pair of arms which are aligned with locking slots contained within the mating fitting which are used to engage pins on the fitting inside the hood when mounting the gas cylinder.

27 Claims, 8 Drawing Figures

GAS CYLINDER COUPLING AND WEIGHTING MECHANISM FOR A CARBONATED DRINK DISPENSER

This invention relates to apparatus useful in a carbonated drink dispenser in general, and more particularly to a device for coupling a gas cylinder to a fitting and a mechanism for weighing the contents of such a cylinder, the device and mechanism being particularly useful in a carbonated drink dispenser.

BACKGROUND OF THE INVENTION

U.S. Pat. No. 4,520,950 discloses an in-home drink dispenser which include a source of concentrate, e.g., syrup, a carbonator which is filled with ice and water and a carbon dioxide tank for supplying carbon-dioxide to carbonate the water in the tank. In such an in-home drink dispenser, it is, of course, important to know how much carbonated water is left and also how much carbon dioxide is left. Knowing when one is about to run out of carbon dioxide is of great importance, particularly where a cylinder is not immediately on hand. The carbonator can be refilled with water and ice; however, if one runs out of carbon dioxide, at a time when the supplier is not open for business, it may be necessary to wait, possibly over a weekend, to get a new cylinder. Thus, the need for an indication of this level is particularly important.

Furthermore, in regard to the carbon dioxide cylinders, since the cylinders are being handled by people not used to such, there is a need to take measures to protect the cylinders and to provide for ease of use, as well as ease of insertion and removal of the cylinder from the drink dispenser.

SUMMARY OF THE INVENTION

The present invention provides a mechanism particularly useful in an in-home drink dispenser and which allows a consumer to easily install a $CO_2$ cylinder in a carbonated drink dispenser and monitor of $CO_2$ usage. The mechanism of the present invention is useful in most drink dispensers but is most opportunely used in a drink dispenser such as the one disclosed in copending patent application Ser. No. 799,911, entitled "In Home Drink Dispenser" assigned to the same assignee as the present invention.

In a typical dispenser, it is necessary to connect the carbon dioxide cylinder to the system. This is done with a connection which, when the connection is made, opens a valve to allow a flow of carbon dioxide out of the gas cylinder. (See for example U.S. Pat. Nos. 4,408,701; 4,328,909, 4,523,697, 4,520,590; 4,570,830; 4,564,483, 4,664,292 and 4,363,424.) In the connections disclosed in the aforementioned applications, a connecting means which provided a relatively high mechanical advantage was provided. This was thought necessary at the time because of the high pressure acting on the probe entering the cylinder, this pressure being too high for the average person to operate against when inserting the cylinder. This, of course, made insertion of the cylinder more difficult. However, the present invention is much more readily used in a dispenser having a very thin probe such as the dispenser disclosed in the aforementioned application 799,911. As also disclosed and claimed therein, because the probe is so thin, the area on which the high pressure acts is materially reduced and the force generated is not beyond that which the average person can act against. Thus, a simple connection with a fitting containing the probe which also has pins which fit into appropriate slots on a member secured to the top of the cylinder is utilized. In accordance with present invention, the gas tank is suspended from the fitting containing the probe, the fitting also containing a pressure regulator. By so suspending the gas cylinder, it is possible to measure its weight by providing an upward bias to the probe fitting, using suitable springs.

In accordance with the present invention, the fitting to which the gas cylinder is attached is supported rotatably within a hood, the hood forming a lever which is biased upwardly. The hood rotates on a shaft supported in a bracket which is attached to a wall of the dispenser. Springs act between the bracket and the hood to bias the hood upwardly. A mechanism, including a planar member, which is guided in a curved slot, maintains the probe vertical so that in any position the user can easily insert a gas cylinder onto the probe without difficulty. The planar member which is guided and which maintains the pin vertical is also provided with indicators visible through a window to indicate the degree of the fullness of the cylinder. A full cylinder will act against the spring and pull the hood all the way down. As the cylinder is used up, the hood will begin to move upwardly until, when the cylinder is completely empty, the hood will be fully up. In accordance with the present invention, the spring is adapted to begin moving the gas cylinder upward only over the last part of the supply, e.g., the last ten percent. Thus, as soon as movement starts the user knows that he is getting near the end of his supply.

The cylindrical member which engages the probe fitting is formed with a pair of arms. The arms are aligned with axial slots which are used for engaging the pins on the probe fitting when locking the two fittings together. By aligning the arms with the axial slots, the user is given a guide and knows exactly how to line up the gas cylinder to insert it onto the probe fitting. Preferably, on the hood, there are alignment markings and an arrow, indicating to the user the direction in which to rotate the handles or arms so as to lock the cylindrical member and, therefore, the $CO_2$ cylinder in place. In the illustrated embodiment, there are holes at the ends of the arms through which a finger can be inserted to hold the gas cylinder. A cover is also placed over this fitting for decorative and protective purposes. The cover has a tear-away tab on the top to allow access to the cylindrical member and fitting when attaching to the probe fitting. The tab cover, however, provides protection during shipping and remains in place until the cylinder is to be used.

DETAILED DESCRIPTION OF THE INVENTION

Figure 1:
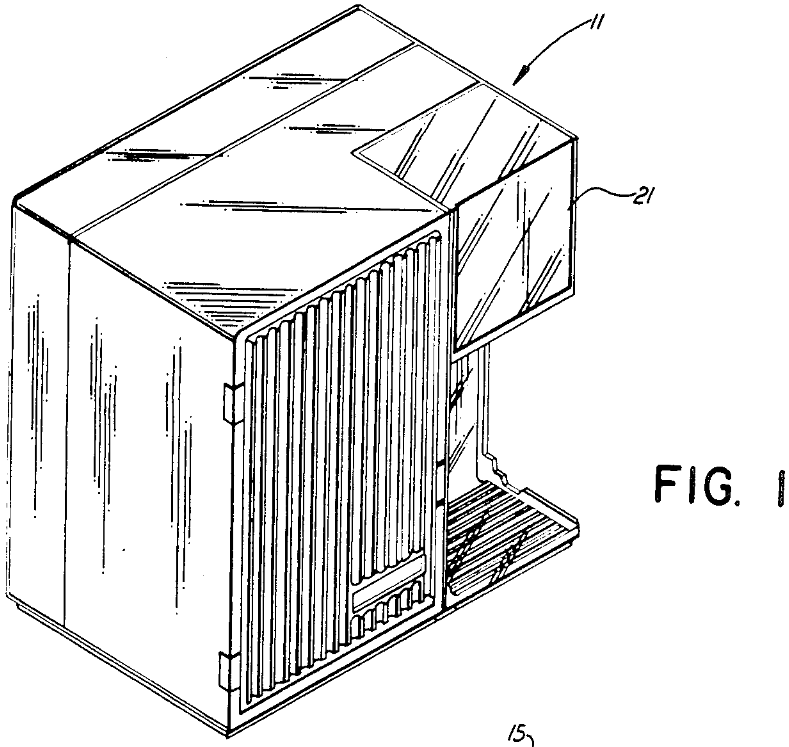
FIG. 1 is a perspective view of an in-home drink dispenser in which the mechanism of the present invention may be used.
Figure 2:
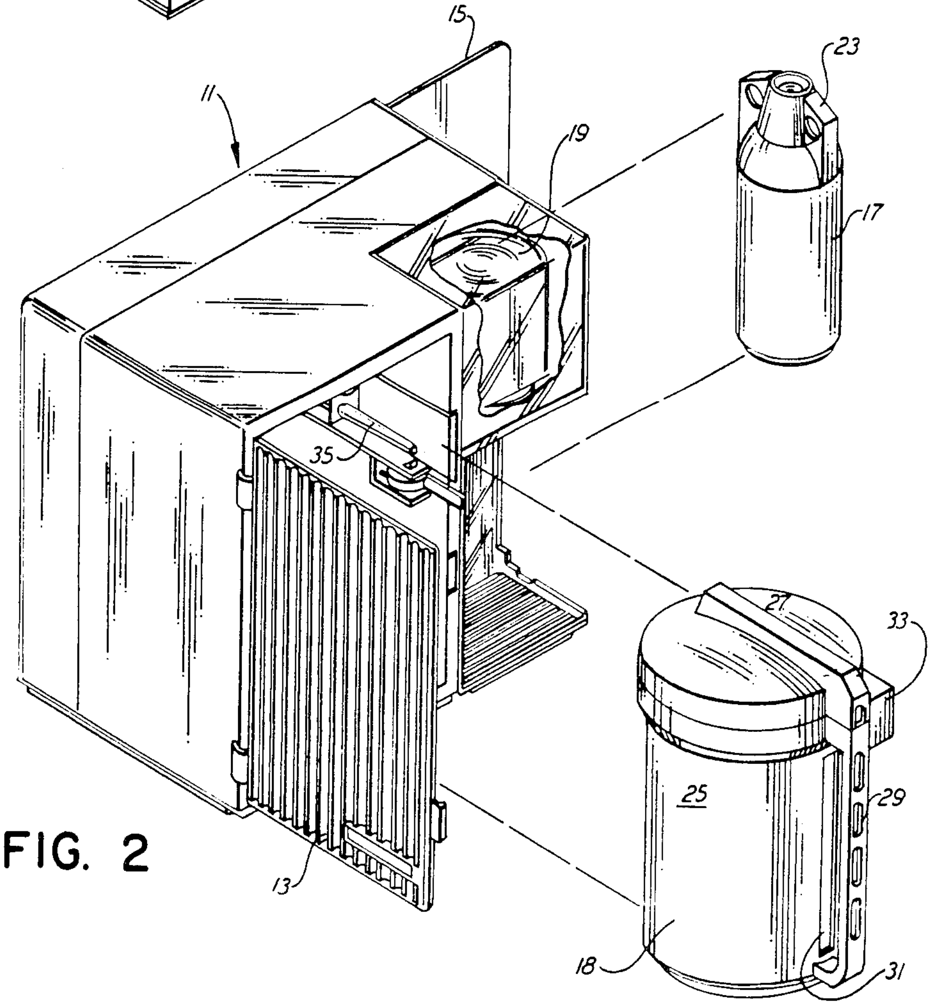
FIG. 2 is a view similar to FIG. 1 showing the door to the carbonator compartment and $CO_2$ compartment opened.

FIGS. 1 and 2 are perspective views of the in-home drink dispenser in which the mechanism of the present invention may be used. FIG. 1 shows the drink dispenser 11 with its doors closed. FIG. 2 shows the dispenser 11 with its carbonator door 13 and $CO_2$ compartment door 15 opened, and the $CO_2$ cartridge 17 and carbonator tank 18 removed. Also visible in FIG. 2 is the syrup cartridge 19. The $CO_2$ cylinder 17 has a cover 23 for ease in handling and also for mounting into the machine in a manner to be described below.

Figure 4:
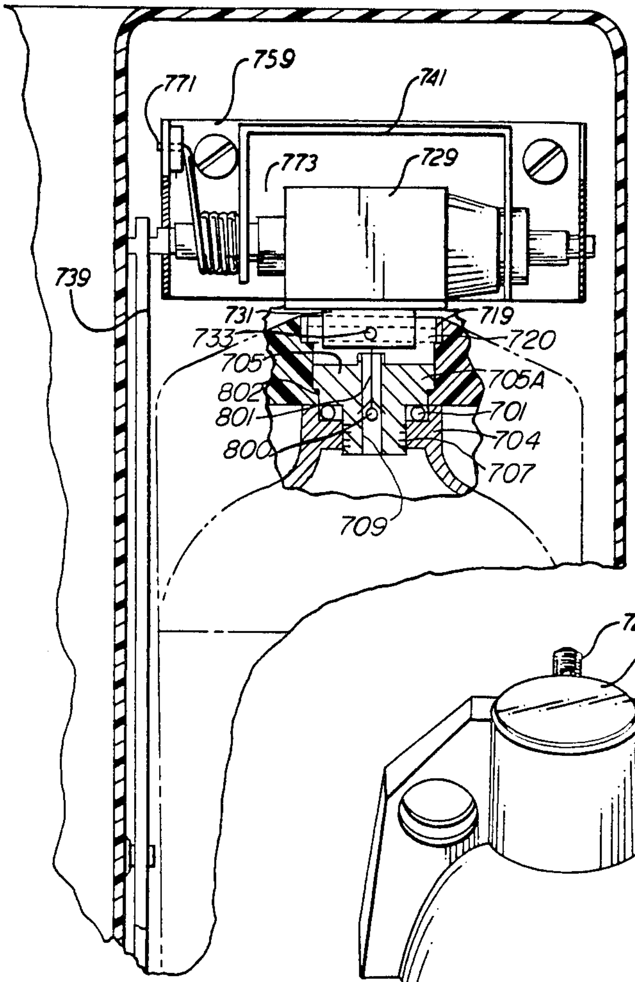
FIG. 4 is an elevation view partially in cross section showing the manner in which the $CO_2$ assembly is attached to a probe fitting in which is incorporated a regulator and also shows part of the weighing mechanism.
Figure 3:
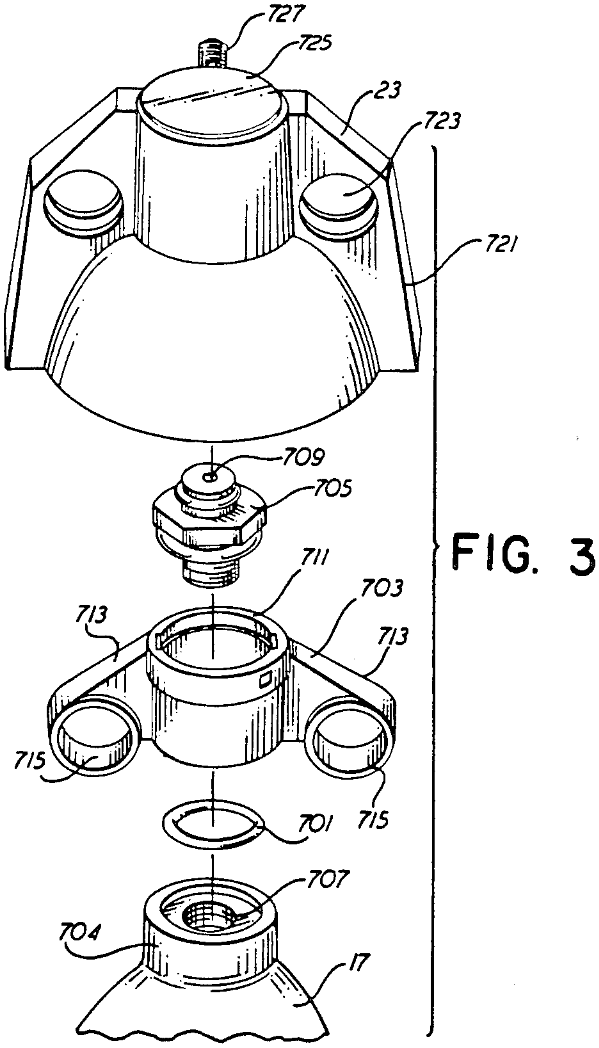
FIG. 3 is an exploded view of the elements attached to the top of the $CO_2$ cylinder.
Figure 5:
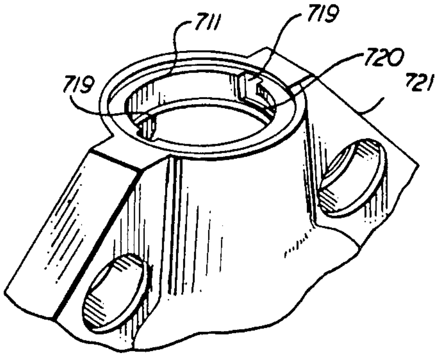
FIG. 5 is a perspective view showing the cylindrical member which permits attachment to the probe fitting of FIG. 4.

FIGS. 3–5 illustrate the cover assembly for the carbon dioxide cylinder 17 and its connection to a regulator which also acts as a weighing mechanism. Referring to FIG. 3, over the end of the gas cylinder 17 there is placed an O-ring seal 701. Next a member 703, which has an inner washer-like portion shown as 802 in FIG. 4, is placed over the neck section 704 of cylinder 17, and held in place by a flange 705A on threaded fitting 705 threaded into the threads 707 in the neck section of the cylinder 17. The fitting 705 contains a check valve, shown schematically as 800 in FIG. 4, which is operated when an appropriate pin or probe is inserted into its opening 709. Member 703 contains a central cylindrical portion 711 with two arms 713 at the ends of which rings 715 are formed as finger grips. As best seen from FIG. 5, on the inside of the cylindrical portion 711 are formed two diametrically opposed axially extending slots 719 which lead to circumferentially extending locking slots 720. These are also shown in FIG. 4. A cover 23 is snapped over the member 703 to give the cylinder the finished appearance illustrated in FIG. 2. The cover is shaped so as to enclose the top of the cylinder 17 as well as the member 703 and includes side parts 721 with openings 723 which align with the openings 715 formed in the arms 713 of member 703. These openings permit a finger grip for ease in handling of the cylinder. The cover 23 contains a tear-away top portion 725 with a tab 727 provided to tear off the cover to permit ease of access to the fitting 709.

The handles 713 or 721 also act as an alignment means. As can be seen from FIG. 5, the axial slots 719 are aligned with the handle 721. Thus, when inserting the gas cylinder on to regulator assembly 729 which has a mating fitting 731 with projections 733 thereon, for engaging in the slots 719 and 720, the handles can be used for alignment purposes. The user simply lines up the handles with the pins 733 and then rotates the handles 721 until they are in a predetermined position in which the cylinder is locked in place against the fitting 731. The fitting 731 includes the hollow probe 801 (schematically shown, FIG. 4) shown schematically) which fits in and seals within the opening 709 and opens the valve 800 therein to permit the flow of carbon dioxide through the regulator and into the rest of the system.

Figure 6:
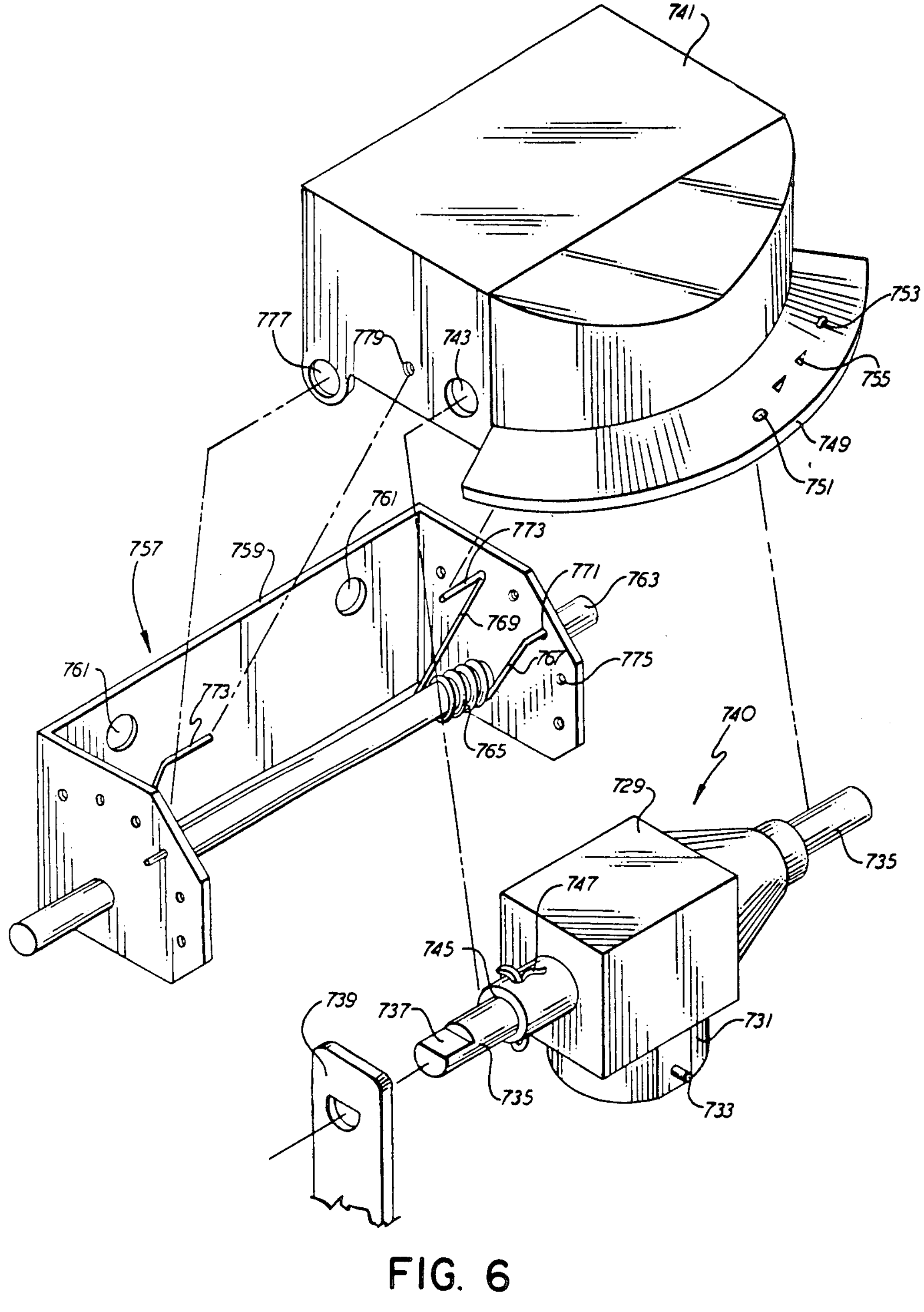
FIG. 6 is an exploded view of the weighing mechanism of the present invention.

The regulator is also shown in FIG. 6 which is an exploded view of the regulator and weighing assembly. The fitting 731 of the regulator 729 with its pins 733 is visible at the bottom of FIG. 6. A shaft 735 extends out from both ends of the regulator. Shaft 735 on the left hand side contains a flat 737. A member 739 to be described in more detail below is placed over this end of the shaft 735. The whole assembly, generally indicated as 740 is inserted into a hood 741 containing holes 743 on each side thereof for accepting the shaft 735. The shaft 735 on the left hand side is held in place in a cylindrical recess 745 attached to the regulator 729 by means of a cotter pin 747. Thus, after the shaft 735 on the right hand side is inserted through its hole 743, the recess 745 is aligned with the hole 743 on the left and the shaft 735 on the left hand side inserted and secured in place with cotter pins 747. Thereafter the member 739 can be placed over the end of the shaft 735. The hood 741 has a brim 749 containing thereon indicia 751 and 753 along with arrows 755. The indicia indicate to the user the proper alignment for the handles 721 in the position where the bottle is inserted and the position where it is locked in place. The hood 741 is held in an assembly 757. This assembly includes a U-shaped bracket 759 having holes 761 in its base for mounting within the gas cylinder compartment of the dispenser. Extending through the two legs of this U-shaped bracket 759 is a shaft 763. At each end of the shaft is a spring 765. This is a coil spring containing arms 767 and 769 each of which are bent at their ends so as to have a portion parallel to the axis of the spring. The portion 767 contains an axially extending portion 71 and portion 769 contains an axially extending portion 773. Portion 771 engages in one of a plurality of holes 775 in the arm of the bracket 759. The bracket 759 encloses the rear portion of the hood 741 with the shaft 763 extending through the opening 777 and the inwardly extending portion 773 engaging in holes 779. Thus, hood 741 comprises a lever which rotates on shaft 763 and is biased upwardly by spring 765.

Figure 7:
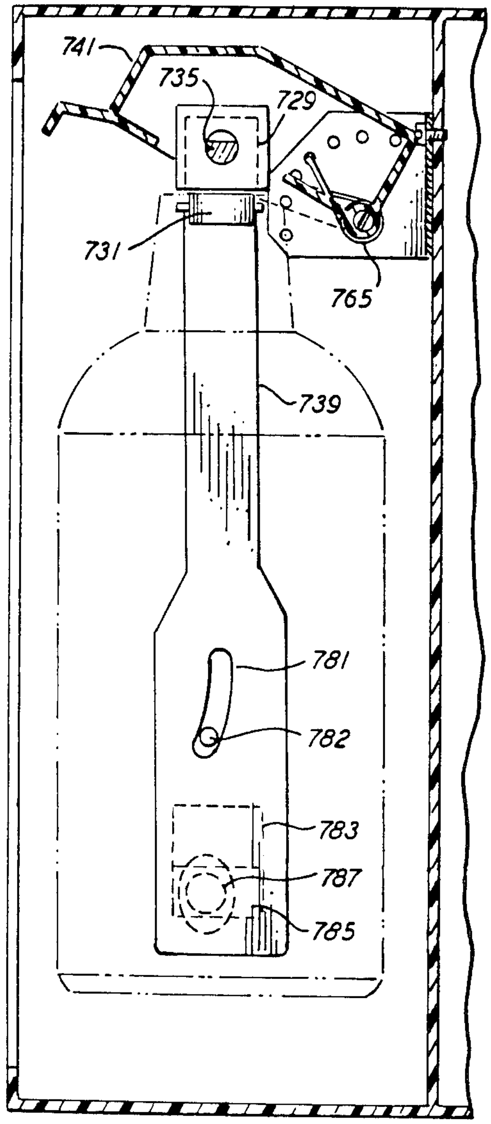
FIGS. 7 and 8 are elevation views, partially in cross section and partially in phantom showing the operation of the weighing mechanism, FIG. 7 showing the weight mechanism with an empty cylinder and FIG. 8 showing the weighing mechanism with a full cylinder.
Figure 8:
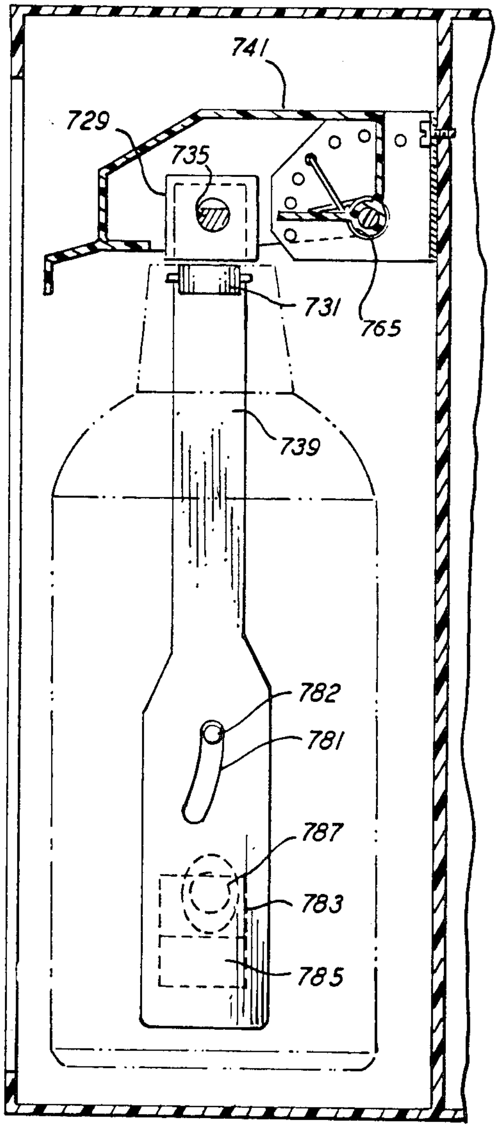

FIGS. 7 and 8 illustrate manner in which the weighing mechanism operates. The previously mentioned member 739 comprises a planar member containing an arcuate slot 781 therein. The slot 781 slidably engages a pin 782 provided on the inside of one of the wall of the cylinder compartment which is adjacent to the planar member 739. Its purpose is to maintain the axis of the fitting 731 vertical irrespective of the rotation of the hood 741. FIG. 7 shows the hood 741 rotated upwardly, corresponding to an empty bottle or no bottle in place. FIG. 8 illustrates the hood 741 rotated downwardly with a full bottle in place. It will be recognized, that the locus of shaft 735 moving between the positions of FIGS. 8 and 9 will exhibit curved motion and, were it not for the slot 781 and pin 782 and the rigid connection of the member 739 to the shaft 735, which in turn is rigidly connected to the regulator 729 and thus to the fitting 731, rotation of the regulator 729 and fitting 731 would take place. It is important that the axis of the fitting 731 be maintained vertical so that $CO_2$ bottles can be easily removed and inserted. The springs 765, thus, tend to bias the cover 741 upwardly into the position shown in FIG. 7. The weight of a full $CO_2$ cylinder acts against this biasing action to bring the cover downward to the position shown in FIG. 8. The biasing force of the spring 765 may be changed based on the users selection of the various holes 775 is bracket 759.

The member 739 performs a second function, the function of an indicator. At the bottom of the member 739 are painted two areas 783 and 785. Area 783 is painted green, for example, and area 785 is painted red. A viewing window 787 is provided in the drink dispenser housing through which the painted areas 783 and 785 can be observed. With a full bottle, one looks through the viewing window 787 and sees the green area 783. As the bottle begins to empty, the red area 785 begins to appear until, when all red, the bottle is essentially empty. Preferably, the biasing force of the springs 765 is such that they operate only over the last ten percent of carbon dioxide in the bottle. That is to say, only when the bottle is, for example, 10 percent full will the bottle become light enough so that the spring begins to move the cover 741 upwardly. This gives a better indication at the end of supply than would a linear system which would be difficult to calibrate.

What is claimed is:

1. A gas cylinder coupling device for a gas cylinder with an axial threaded bore formed in the top thereof comprising:

(a) an O-ring seal surrounding the bore in said cylinder;

(b) a hollow cylindrical member having diametrically opposed arms, extending therefrom, openings formed in the ends of each of said arms, an annular wall formed at the axial inner, end of said cylindrical member, said annular wall overlying the top of said gas cylinder; and (c) a first fitting having one axial end threaded to mate with the threads in the bore of said gas cylinder and an enlarged portion outwardly of said threads, said fitting threaded into said opening in said gas cylinder, sealing against said O-ring and trapping said annular wall between said enlarged portion and the top of said gas cylinder, and the other axial end thereof adapted to accept a second fitting.

2. A device according to claim 1 further comprising a cover placed over said hollow cylindrical member, said over enclosing said hollow cylindrical member and having a handle means for fitting over the arms thereof, with holes therein mating with the holes in said arm.

3. A device according to claim 2 further comprising a removable tab on the top of said cover.

4. A device according to claim 1, further comprising means on said hollow cylindrical member for lockingly engaging with said second fitting adapted to mate with said first fitting.

5. A device according to claim 4, wherein said means for lockingly engaging comprise at least two internal locking slots formed on the inside of said cylindrical member, eaCh slot having an axially extending portion and a circumferentially extending portion, said axially extending portion leading from the top of said member to said circumferentially extending portion.

6. A device according to claim 5, wherein two locking slots are provided, the axial portions of which are aligned with said arms.

7. A device according to claim 6, in combination with a second fitting, said second fitting comprising a cylindrical member having projecting from the center thereof a probe containing a passage for conducting gas and having on the outside suface thereof diametrically opposed pins engaging in the slot in said cylindrical member so as to lock said first and second fittings together.

8. A device according to claim 7 further comprising a regulator formed integrally with said second fitting.

9. A device according to claim 8 further comprising a weighing mechanism from which said regulator is suspended.

10. A device according to claim 9, wherein said weighing mechanism comprises means biasing said regulator upwardly against the downwardly acting weight of said gas cylinder and indicator means for indicating the relative position of said second fitting.

11. A device according to claim 10, wherein said means biasing comprise means forming a rotatable lever at the end of which said regulator is mounted; and means for biasing said lever upwardly.

12. A device according to claim 11 further comprising means for mounting said regulator to said lever in such a way that said probe is maintained vertical as said lever rotates.

13. A device according to claim 12, wherein said lever comprises:

a hood having a top and side walls, a rounded front wall and a brim extending therefrom, holes formed in said side walls near said front wall;

a shaft extending from each side of said regulator passing through said holes in said side walls whereby said regulator is rotatable with respect to said hood;

means for maintaining said regulator such that said probe is vertical by bringing about relative rotation between said regulator and said hood as said hood rotates.

14. A device according to claim 13, wherein said means biasing comprise:

a U-shaped bracket having a base and two extending arms, said base mounted to a vertical wall, a hole formed in each arm;

a shaft passing through said holes, said side wall of said hood having a hole at the rear thereof through which said shaft passes, said hood thereby being rotatable on said shaft; and at least one spring acting between said arm of said bracket and said hood biasing said hood upwardly.

15. A device according to claim 14, wherein the biasing force of said spring is such as to be effective to move said gas cylinder upwardly only over a fraction of its weight.

16. A device according to claim 15, wherein said fraction is one-tenth.

17. A device according to claim 13, wherein said means maintaining said pin probe vertical comprise:

planar member rigidly coupled at one end to one end of said shaft extending from said regulator said planar member having a curved slot therein;

a wall formed parallel to said planar member;

a pin extending from said wall and slidably engaging said planar member curved slot, guiding said planar member so that it remains vertical as said hood rotates, whereby said probe will also remain vertical.

18. A device according to claim 17 wherein said wall contains a viewing hole and said planar member contains color coded areas viewable through said viewing hole such that the position of said planar member and thus the weight of said gas cylinder will be indicated.

19. A mounting and weighing mechanism for a gas cylinder comprising:

(a) a first fitting, said first fitting comprising a cylindrical member containing a passage for conducting gas and having on the outside surface thereof diametrically opposed means for engaging a second mating fitting of a gas cylinder such that the gas cylinder is suspended from said first fitting; and (b) a weighing mechanism to which said first fitting is attached including: means forming a rotatable lever at the end of which said first fitting is mounted; means for biasing said lever upwardly against the downwardly acting weight of said gas cylinder; and indicator means for indicating the relative position of said second fitting.

20. A device according to claim 19 further comprising means for mounting said first fitting to said lever in such a way that said probe is maintained vertical as said lever rotates.

21. A device according to claim 20, wherein said lever comprises:

a hood having a top and side walls, a rounded front wall and a brim extending therefrom, holes formed in said side walls near said front wall;

a shaft extending from each side of said first fitting passing through said holes in said side walls whereby said first fitting is rotatable with respect to said hood; and means for maintaining said first fitting such that said probe is vertical by bringing about relative rotation between said first fitting and said hood as said hood rotates.

22. A device according to claim 21, wherein said means biasing comprise:

a U-shaped bracket having a base and two extending arms, said base mounted to a vertical wall, a hole formed in each arm;

a shaft passing through said holes, said side walls of said hood having holes at the rear thereof through which said shaft passes, said hood thereby being rotatable on said shaft; and at least one spring acting between said arm of said bracket and said hood biasing said hood upwardly.

23. A device according to claim 22, wherein the biasing force of said spring is such as to be effective to move said gas cylinder upwardly only over a fraction of its weight.

24. A device accoring to claim 23, wherein said fraction is about one-tenth.

25. A device according to claim 21, wherein said means maintaining said probe in vertical comprises:

a planar member rigidly coupled at one end to one of said shaft extending from said first fitting said planar member having a curved slot therein;

a wall formed parallel to said planar member; and a pin extending from said wall and slidably engaging said planar member curved slot, guiding said planar member so that it remains vertical as said hood rotates, whereby said probe will also remain vertical.

26. A device according to claim 25 wherein said wall contains a viewing hole and said planar member contains color coded areas viewable through said viewing hole such that the position of said planar member and thus the weight of said gas cylinder will be indicated.

27. A device according to claim 19 further comprising a regulator formed integrally with said first fitting.

* * * * *

UNITED STATES PATENT AND TRADEMARK OFFICE
CERTIFICATE OF CORRECTION

PATENT NO. : 4,712,713

DATED : 15 December 1987

INVENTOR(S) : KARLIS et al.

It is certified that error appears in the above-identified patent and that said Letters Patent is hereby corrected as shown below:

Title page and
Column 1, line 2 of the title: change "WEIGHTING" to --WEIGHING--.

Column 3, line 35: after "probe" insert --, shown schematically as 801,--.

Column 3, line 65: delete "shown schematically".

Column 3, line 65: change "shown, FIG. 4" to --shown in FIG. 4--.

Column 4, line 33: change "71" to --771--.

Column 4, line 46: change "wall" to --walls--.

Column 4, line 67: change "users" to --user's--.

Column 4, line 68: change "is" to --in--.

Column 5, line 28: change "inner, end" to --inner end--.

Column 5, line 43: change "having a handle" to --having handle--.

Column 5, line 54: change "eaCh" to --each--.

Column 6, line 50: change "said pin probe" to --said probe--.

Column 6, line 51: change "planar" to --a planar--.

UNITED STATES PATENT AND TRADEMARK OFFICE

CERTIFICATE OF CORRECTION

PATENT NO. : 4,712,713
DATED : 15 December 1987
INVENTOR(S) : KARLIS et al.

It is certified that error appears in the above-identified patent and that said Letters Patent is hereby corrected as shown below:

Column 6, line 52: change "regulator said" to --regulator, said--.

Column 8, line 17: change "probe in vertical" to --probe vertical--.

Column 8, line 18: change "one of" to --one end of--.

Column 8, line 19: change "fitting said" to --fitting, said--.

Signed and Sealed this

Thirteenth Day of September, 1988

*Attest:*

DONALD J. QUIGG

*Attesting Officer* *Commissioner of Patents and Trademarks*